3,298,245
DETENT-HELD OPERATING MEMBERS
Horace Arthur Cross, Newport, England, assignor to Girling Limited, Birmingham, England, a British company
Filed Nov. 21, 1963, Ser. No. 325,357
3 Claims. (Cl. 74—540)

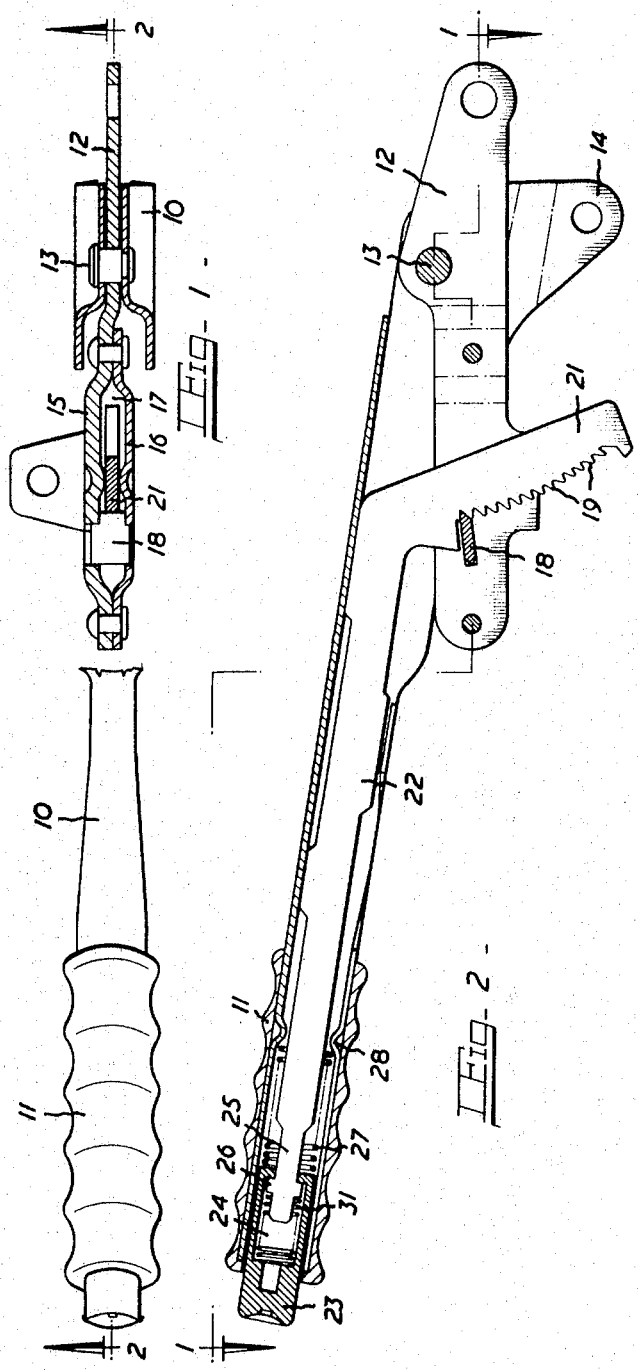

This invention relates to operating members held in an operative position against a releasing force by means of detent which can be disengaged to release the member. An example of such a member is the handbrake rod or lever used for applying the brake of a motor vehicle, where the lever or rod is pulled to tension the cables or other linkage leading to the brakes and is held in the applied position, against the pull of the brake linkage, by a detent, usually in the form of a pawl engaging any one of the teeth of a ratchet. To release the brake the pawl is disengaged from the ratchet by means, in the case of a handbrake lever of the pivoted kind, of a push-button or subsidiary lever mounted in the operative end of the lever. In the case of a "pull" or "umbrella" type of handbrake rod the release of the pawl is generally achieved by twisting the rod, although it may also be by depression of an auxiliary lever or button in the umbrella handle.

With such operating members there is a danger that the member can be inadvertently released by an accidental blow on the release button or lever. It is an aim of the invention to reduce the risk of this happening.

According to the invention, in an operating member held in its operative position against a releasing force by means of a detent which can be disengaged by a release member, the release member is connected to the detent through a yielding or resilient connection of such characteristics that the movement of the release member is not transmitted to the detent unless the detent has first been at least partly relieved of its load by being moved, for example, slightly in a load applying direction. In this way even inadvertent movement of the release member over its full travel will not cause disengagement of the detent, and disengagement will only take place if the operating member has first been urged at least a very small additional distance in the applying direction so as to take the releasing force and allow the detent to move easily.

For example, in applying the invention to a handbrake lever or rod with a push button release member and a detent in the form of a pawl engaging a ratchet, one can include a spring, such as a helical coil compression spring, in the linkage between the push button and whatever moves to disengage the pawl from the ratchet. Then even when the button is fully depressed the pawl will not be disengaged until the lever or rod is moved further in the brake-applying direction to take the tension in the brake cables or other brake linkages and relieve the pawl of the load.

One embodiment of our invention is applied to a handbrake lever for a vehicle is illustrated by way of example in the accompanying drawings in which:

FIGURE 1 is a plan of the lever assembly partly in section on the line 1—1 of FIGURE 2, and
FIGURE 2 is a vertical section on the line 2—2 of FIGURE 1.

In the drawings the handbrake lever 10 is tubular over the greater part of its length and at its outer end is fitted with a hand grip 11 which may be a moulded plastic sleeve.

At its inner end the lever is longitudinally slotted to fit over a fixed mounting plate 12 on which the lever is pivoted by means of a shouldered pin 13. The inner extremity of the lever has a downward extension 14 to which a brake cable or link (not shown) is attached.

A portion 15 of the bracket is joggled or offset laterally to provide in conjunction with a joggled pressing 16 an elongated opening 17. A stationary pawl 18 is mounted in the opening at the end remoted from the lever pivot.

The pawl co-operates with ratchet teeth 19 on a cranked arm 21 extending downwardly into the opening 17 from the inner end of a bar 22 extending longitudinally within the lever in which it is slidably guided. A push-button 23 is slidably mounted in and projects from the outer end of the lever and the push-button has an axial recess 24. The outer end of the bar 22 is shaped to provide a narrow neck 25 which passes through a slot in an inturned flange at the inner end of the push-button and a wider abutment portion 26 which is slidable in the recess 24. This arrangement provides a lost-motion coupling between the push-button and the bar and allows the button to be pushed in without necessarily moving the bar.

The bar is urged in a direction away from the lever pivot to hold the ratchet teeth 19 in engagement with the pawl by a compression spring 27 housed in the lever and abutting between the inner end of the push-button and an abutment 28 formed by rolling an annular inwardly projecting rib in the lever. A further compression spring 31 is located in the push-button between the outer end of the recess 24 and the abutment portion 26 of the bar.

The spring 31 normally holds the push-button in the position shown in which it projects from the end of the lever, the outward movement of the push-button being limited by the engagement of the inner end of the recess 24 with the abutment portion 26 on the bar.

When the brake has been applied and the lever is under load due to the tension in the brake cable or link considerable resistance to axial movement of the bar in a direction to release the ratchet from the pawl will be offered by the engagement of the pawl with a ratchet tooth.

If the button is pushed in it will compress the springs 27 and 31 and the spring 31 bearing on the abutment portion 26 of the bar will apply a force to the bar tending to move it in a direction to release the ratchet from the pawl but the characteristics of the spring are such that the button can perform its full travel without the force applied to the bar rising to a value sufficient to move the bar against the resistance offered by the engagement of the ratchet with the pawl. The brake cannot therefore be released by simply depressing the push-button.

To release the brake it is necessary first to move the lever slightly further in the brake applying direction to relieve the load on the ratchet and the bar can then be moved inwardly by the push-button acting through the spring 31 to free the ratchet from the pawl and allow the lever to move into the released position.

I claim:
1. Brake applying mechanism for a vehicle brake comprising an applying lever movable to apply tension thereto and mounted on a stationary part, a fixed pawl on the stationary part, a bar slidably guided in the lever, ratchet teeth on the bar adapted to co-operate with said pawl to hold said lever in a brake applying position, and a manually operated release member operable to move said bar and release said ratchet teeth from the co-operation with said pawl.

2. Brake applying mechanism as claimed in claim 1, and further including a fixed pivot in said stationary part about which said lever is angularly movable, and means guiding said bar for movement in the lever in a longitudinal direction only to release said ratchet teeth and said pawl.

3. Brake applying mechanism as claimed in claim 2, wherein said manually operated release member comprises a push-button mounted in the lever, and a spring coupling said bar to said push-button and adapted to transmit a force from the push-button to the bar, said spring being constructed and arranged to be of insufficient strength to move the bar until the lever has been moved in a brake applying direction to relieve the ratchet teeth of load.

References Cited by the Examiner

UNITED STATES PATENTS

| | | | |
|---|---|---|---|
| 1,016,980 | 2/1912 | Bender | 74—503 X |
| 1,304,955 | 5/1919 | Fowler | 74—470 X |
| 1,823,695 | 9/1931 | Moorhouse | 74—540 |
| 2,020,005 | 11/1935 | Smith | 74—538 |
| 2,122,646 | 7/1938 | Jandus | 74—541 |
| 2,329,724 | 9/1943 | Maurer. | |
| 2,591,495 | 4/1952 | Baldwin et al. | 74—538 X |
| 2,986,362 | 5/1961 | Gimalouski | 74—538 X |

FRED C. MATTERN, Jr., *Primary Examiner.*

BROUGHTON G. DURHAM, *Examiner.*

C. F. GREEN, *Assistant Examiner.*